(12) United States Patent
Lohe et al.

(10) Patent No.: US 11,691,517 B1
(45) Date of Patent: Jul. 4, 2023

(54) EMERGENCY HIGH VOLTAGE DISCONNECTION DEVICE FOR AN ELECTRIC AIRCRAFT

(71) Applicant: BETA AIR, LLC, South Burlington, VT (US)

(72) Inventors: Braedon Lohe, Essex Junction, VT (US); Sean Donovan, Richmond, VT (US); Nathan William Joseph Wiegman, Williston, VT (US); Sam Wagner, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/736,191

(22) Filed: May 4, 2022

(51) Int. Cl.
  *B60L 3/00* (2019.01)
  *B64D 27/24* (2006.01)
  *H02J 7/00* (2006.01)

(52) U.S. Cl.
  CPC ............ *B60L 3/0046* (2013.01); *B64D 27/24* (2013.01); *H02J 7/0032* (2013.01); *B60L 2200/10* (2013.01)

(58) Field of Classification Search
  None
  See application file for complete search history.

(56) References Cited

U.S. PATENT DOCUMENTS

| | | | |
|---|---|---|---|
| 7,876,542 B2 | 1/2011 | Rozman et al. | |
| 8,296,036 B2 | 10/2012 | Matuszeski et al. | |
| 8,612,073 B2 | 12/2013 | Fuji et al. | |
| 8,757,542 B2 | 6/2014 | Hopdjanian et al. | |
| 8,890,463 B2 | 11/2014 | Rozman et al. | |
| 9,376,213 B2 | 6/2016 | Rolt | |
| 9,755,417 B2 | 9/2017 | Siciak et al. | |
| 10,693,411 B2 | 6/2020 | Yu | |
| 10,913,543 B2 | 2/2021 | Bailey et al. | |
| 10,951,024 B2 | 3/2021 | Bethel et al. | |
| 11,180,033 B2 | 11/2021 | Achatz | |
| 2020/0164995 A1 | 5/2020 | Lovering et al. | |
| 2020/0274386 A1 | 8/2020 | Kirleis et al. | |
| 2020/0290742 A1* | 9/2020 | Kumar | B64D 27/24 |
| 2021/0261261 A1 | 8/2021 | Piotrowski | |
| 2021/0276424 A1 | 9/2021 | Berry et al. | |
| 2022/0328893 A1* | 10/2022 | Oenick | B60L 3/0046 |

FOREIGN PATENT DOCUMENTS

| | | |
|---|---|---|
| CN | 1354556 A | 6/2002 |
| CN | 1354556 A | 6/2002 |
| WO | 2015078049 | 6/2015 |

OTHER PUBLICATIONS

Russ Graves, Designing Connectivity Solutions for an Electric Aircraft Future, Oct. 1, 2020.
TE Connectivity , Aerospace and Military Contactors, Dec. 31, 2021.

\* cited by examiner

*Primary Examiner* — Jared Fureman
*Assistant Examiner* — Aqeel H Bukhari
(74) *Attorney, Agent, or Firm* — Caldwell Intellectual Property Law

(57) ABSTRACT

A device for emergency disconnection of a high voltage electrical connection between a power source and a high voltage component of an electric aircraft in response to a crash. The device includes a controller, where the controller is configured to receive a sensor datum from a sensor of device, to determine a crash element between and initiate a disconnection protocol as a function of the crash element.

20 Claims, 10 Drawing Sheets

EMERGENCY HIGH VOLTAGE DISCONNECTION DEVICE FOR AN ELECTRIC AIRCRAFT

FIELD OF THE INVENTION

The present invention generally relates to the field of electric aircraft. In particular, the present invention is directed to an emergency high voltage disconnection device for an electric aircraft.

BACKGROUND

Failure to disconnect an electrical system of an aircraft from a power source during or after a crash can lead to substantial harm to persons and/or damage to a surrounding environment.

SUMMARY OF THE DISCLOSURE

In an aspect, a device for emergency shutdown of a high voltage system for an electric aircraft in response to a crash scenario is presented. The device includes: an electrical connection configured to transfer electrical power from a power source of an electric aircraft, wherein the electrical connection includes: a first conductor attached to a power source; and a second conductor attached to the first conductor; and a safety mechanism connected to the first conductor and the second conductor, the safety mechanism having an enabled position and a disabled position, wherein the safety mechanism is configured to: allow, in the disabled position, the transfer of electrical power from the first conductor to the second conductor; terminate, in the enabled position, the electrical connection, wherein the safety mechanism moves from the disabled position to the enabled position upon the electric aircraft experiencing a crash.

In another aspect, a method for emergency disconnection of an electric connection of a power source upon detection of a crash of the electric aircraft. The method including: A method for emergency disconnection of an electric connection of a power source of an electric aircraft in response to a crash, the method including: providing an emergency high voltage disconnection device, the device including: an electrical connection, wherein the electrical connection includes: a first conductor attached to a power source; and a second conductor attached to the first conductor; and a safety mechanism connected to the first conductor and the second conductor, the safety mechanism having an enabled position and a disabled position; transferring, in a disabled position of the device, electrical power from a power source from the first conductor to the second conductor; terminating, in an enabled position of the device, the electrical connection so that electrical power cannot traverse from the first conductor to the second conductor, wherein the safety mechanism moves from the disabled position to the enabled position upon the electric aircraft experiencing a crash.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an emergency disconnection device for shutdown of a high voltage power source in response to an emergency situation. For example, and without limitation, a disconnection device may be used to disconnect a high voltage power source during a crash and/or impact scenario of an electric aircraft. In one or more embodiments, aspects of the present disclosure can be used to automatically and instantly disable a connection between a power source and, for example, a high voltage component or a high voltage system of an electric aircraft, such as an electric vertical take-off and landing (eVTOL) aircraft. The disconnection of a high voltage component during or after a crash can prevent substantial harm to persons, such as crew, and damage to a surrounding environment. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
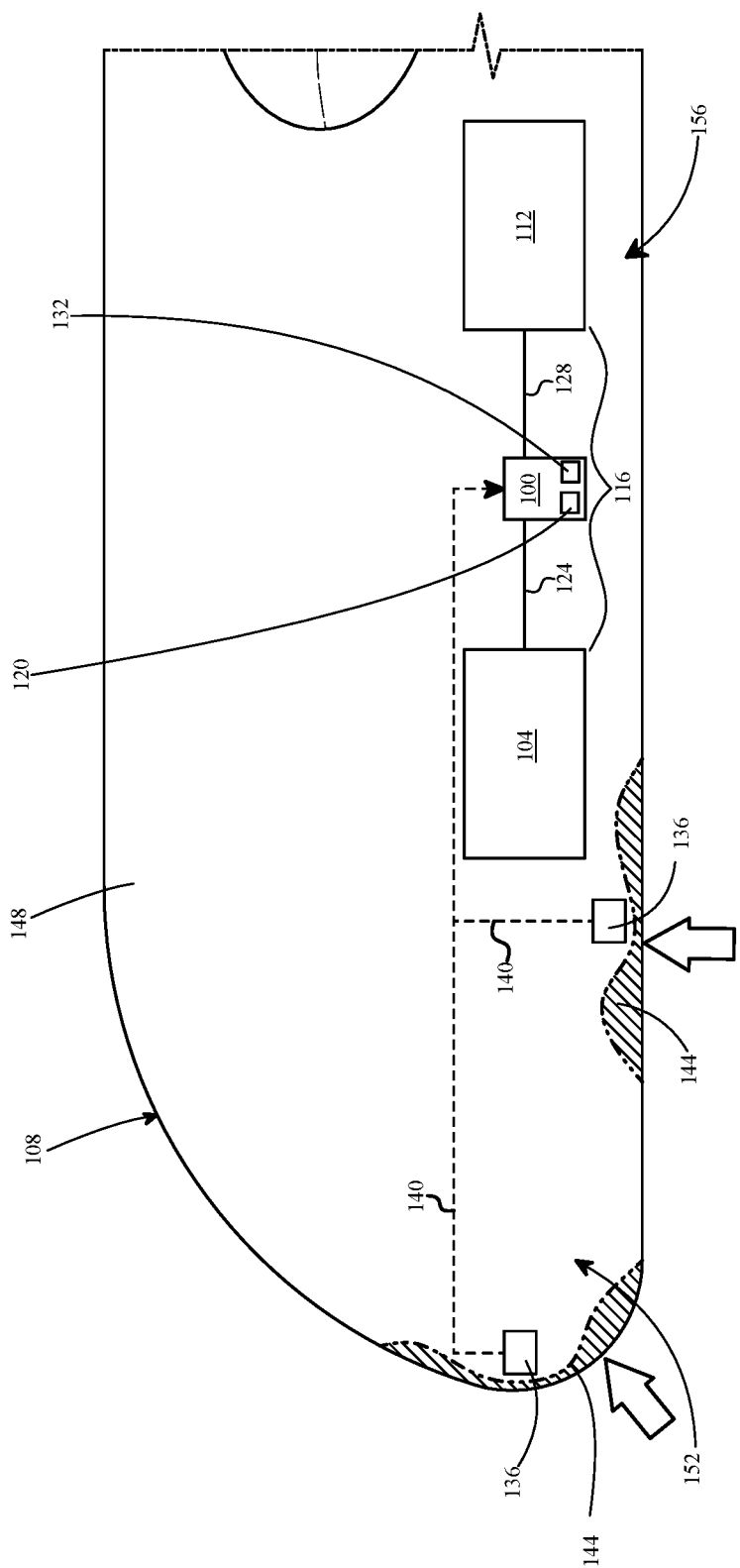
FIG. 1 is a block diagram of an exemplary embodiment of an emergency high voltage disconnection device in accordance with one or more embodiments of the present disclosure.

Referring now to FIG. 1, a block diagram of an exemplary embodiment of an emergency high voltage disconnection device 100 is illustrated. Device 100 is connected to an electrical connection of a power source 104 of an electric aircraft 108. In some embodiments, electrical connection may be within power source 104. In other embodiments, electrical connection may be between power source 104 of electric aircraft 108 and a high voltage component 112, such as a high voltage (HV) bus, of electric aircraft 108. Device 100 may be attached to electric aircraft 108. In one or more embodiments, device 100 is in communicatively connected with power source 104 of electric aircraft 108. In one or more embodiments, power source 104 and HC component 112 may be in electrical connection 116 with each other via conductors, as discussed further in this disclosure. In other embodiments, electrical connection 116 may be within power source 104, such as a electrical connection between individual battery modules of power source 104, as discussed further in this disclosure. An "electrical connection," for the purpose of this disclosure, is a joining of electrical devices to create an electrical circuit. Device 100 may be in electric communication with power source 104 and HV component 112. For the purposes of this disclosure, a "power source" is a device that provides electricity and/or electrical power to an aircraft or components thereof. Power source may include, for example, an electrical energy source, a generator, a photovoltaic device, a fuel cell such as a hydrogen fuel cell, direct methanol fuel cell, and/or solid oxide fuel cell, an electric energy storage device (e.g., a capacitor, an inductor, and/or a battery). Power source 104 may include a battery and/or battery pack, which may include a battery cell, or a plurality of battery cells each connected in series into a module and each module connected in series or in parallel with other modules. Configuration of a power source containing connected modules may be designed to meet an energy or power requirement and may be designed to fit within a designated footprint in an electric aircraft in which aircraft 108 may be incorporated.

In one or more embodiments, power source 108 may be used to provide a steady supply of electrical power to a load over the course of a flight by a vehicle or other electric aircraft. For example, a power source may be capable of providing sufficient power for "cruising" and other relatively low-energy phases of flight. A power source may also be capable of providing electrical power for some higher-power phases of flight as well, particularly when the energy source is at a high state of charge (SOC), as may be the case for instance during takeoff. In embodiment, a power source may be capable of providing sufficient electrical power for auxiliary loads including without limitation, lighting, navigation, communications, de-icing, steering or other systems requiring power or energy. Further, power source may be capable of providing sufficient power for controlled descent and landing protocols, including, without limitation, hovering descent or runway landing. As used in this disclosure, power source may have high power density where electrical power of power source can usefully produce per unit of volume and/or mass is relatively high. "Electrical power," as used in this disclosure, is defined as a rate of electrical energy per unit time. Power source may include a device for which power that may be produced per unit of volume and/or mass has been optimized, at the expense of the maximal total specific energy density or power capacity, during design. Non-limiting examples of items that may be used as at least a power source may include batteries such as Lithium-ion (Li-ion) batteries, which may include NCA, NMC, Lithium iron phosphate (LiFePO4) and Lithium Manganese Oxide (LMO) batteries, which may be mixed with another cathode chemistry to provide more specific power if the application requires Li-metal batteries, which have a lithium metal anode that provides high power on demand, Li-ion batteries that have a silicon or titanite anode. Power source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. Power source may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as a power source.

In one or more embodiments, power source may include a plurality of power sources, referred to in this disclosure as a module of power sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of power source may be based on individual battery cell performance, or an extrapolation based on measurement of at least an electrical parameter. In an embodiment, where power source includes a plurality of battery cells, overall power output capacity may be dependent on electrical parameters of each individual cell.

In one or more embodiments, device 100 is in indirect electric communication with high voltage (HV) component 112, such as a high voltage (HV) bus, via an electrical connection 116. Electrical connection 116 may be created by, for example and without limitation, wires and/or cables. For the purposes of this disclosure, a "high voltage component" is a component used for high voltage power distribution by conducting electricity from a power source and transmitting the electrical power to other components and/or systems of an electric aircraft, such as a motor, inverter, high voltage (HV) systems, and the like. A motor may include a motor that operates to move one or more lift or push propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In one or more embodiments, HV component 112 may include one or more types of conductors, device, and/or systems that operate at a high voltage. In one or more embodiments, HV component may include a potential in excess of 60 VDC or 30 VAC during normal operation. The high voltage component may be consistent with the ring bus disclosed in patent application Ser. No. 17/564,430, entitled "SYSTEMS AND METHODS FOR REDISTRIBUTING ELECTRICAL LOAD IN AN ELECTRIC AIRCRAFT", which is incorporated in this disclosure in its entirety.

With continued reference to FIG. 1, device 100 includes a safety mechanism 120. For the purposes of this disclosure, a "safety mechanism" is device configured to create and/or terminate an electrical connection between a power source and a high voltage component based on circumstances of an electric aircraft, such as whether or not the electric aircraft has experienced a crash and/or impact. In some embodiments, safety mechanism 120 may include an electronically-controlled device for an active disconnection of power source, as described in FIG. 1. In other embodiments, safety mechanism 120 may include a frangible connection mechanism for a passive disconnection of power source, as described in FIGS. 2 and 3. For example, and without limitation, safety mechanism 120 may open or close an electrical power circuit, such as electrical connection, based on a control signal received from a controller, as discussed further in this disclosure. In one or more embodiments, safety mechanism 120 is connected to power source 104 and HV component 112 using conductors to create an electrical connection 116 between power source 104 and HV component 112. More specifically, safety mechanism 120 is connected to power source 104 using a first conductor 124, and safety mechanism 120 is connected to HV component 112 using a second conductor 128. First conductor 124 and second conductor 128 may be connected to create electric communication between power source 104 and HV component 112, which is discussed previously in this disclosure. Safety mechanism 120 allows for electricity to flow between power source 104 and HV component 112 when in a disabled position. For example, and without limitation, safety mechanism 120 allows for electricity to travel from first conductor 124 to second conductor 128 when safety mechanism is in a disabled position. Thus, safety mechanism 120 is conductive and the circuit is complete when safety mechanism is in a disabled position. However, when safety mechanism 120 is in an enabled position, electricity cannot flow between power source 104 and HV component 112. For example, and without limitation, electricity cannot flow from first conductor 124 to second conductor 128. In some embodiments, safety mechanism 120 may reduce electrical power instead of completely terminating electrical connection 116. For example, and without limitation, conductor potential of an HV component 112 may be reduced to below 60 VDC or 30 VAC after detection of a crash, such as, for example, within one second of a crash of electric aircraft 108 occurring. In one or more embodiments, safety mechanism 120 may create an electrical isolation within high voltage component, such as a conductor bus, of no less than 500 Ohms/V for AC or 100 Ohms/V for DC.

In one or more embodiments, safety mechanism 120 may include a pyrotechnical device, such as a pyrotechnical safety switch (PSS) or pyroswitch. For the purposes of this disclosure, a "pyrotechnical device" is an explosive device that uses combustion to physically sever and/or disconnect an electrical connection, and thus electric communication, between a power source and HV component. A pyrotechnical device may be a compact device that includes an electrical interrupter. A pyrotechnical device may include a cutter, where a pyrotechnic-generated energy is used to power a cutting mechanism of the pyrotechnic device. For example, and without limitation, a pyrotechnic device, such as a cutter, may be used to physically sever electric communication wires in order to achieve a disconnection by, for example, driving a wedge between first conductor 124 and second conductor 128 to sever a connection between first conductor 124 and second conductor 120. In other embodiments, pyrotechnic device may include gas generators, igniters, switches, relays, valves, any combination thereof, and the like. Pyrotechnical device moving into an enabled position may include a combustion that physically destroys electric communication between power source 104 and HV component 112. For example, and without limitation, a wedge of pyrotechnical device may be driven by a small explosive of pyrotechnical device into one or more wire and/or cable of electrical connection 116 to terminate electrical connection 116.

In one or more embodiments, safety mechanism 120 may include a contactor. For the purposes of this disclosure, a "contactor" is an electrically-controlled device that may terminate and/or disconnect an electric communication based on a current induced therethrough, such as a current provided by controller 132 using a disconnection protocol, as discussed further below in this disclosure. In some cases, and without limitation, contactor may include a normally closed (NO) contactor or a normally closed (NC) contactor. For example, and without limitation, contactor may include a NC contactor that is closed, in a conductive state, and allows electrical power to flow therethrough and thus be transferred from power source 104 to high voltage component 112; if a crash is determined, then contactor is immediately opened to break the circuit and prevent a flow of electrical power from power source 104 to high voltage component 112. A contactor may include a low-voltage coil, or electromagnet, that may move contacts within contactor to create a closed or open circuit. In one or more embodiments, safety mechanism 120 may include both a pyrotechnical device and contactor for redundancy purposes and to ensure that disconnection of electrical connection and termination of an electrical communication between power source 104 and high voltage component 112 occurs in a crash scenario. Contactor moving into an enabled position may include contacts moving within an enclosure of contactor to physically break an electrical connection between power source 104 and HV component 112.

With continued reference to FIG. 1, device 100 may include a sensor 136 configured to detect an emergency situation, such as a crash, of electric aircraft 108. For instance, and without limitation, sensor 136 may detect physical characteristics of a crash of electric aircraft 108. For example, and without limitation, sensor 136 may detect that fuselage 148, such as nose 152 and/or body 156 of electric aircraft 108 have impacted an external surface, such as the ground or another aircraft, and has been crushed, creating an crush zone 144 in fuselage 156. Sensor 136 may include one or more sensors. For example, and without limitation, sensor 136 may include a plurality of sensors. As used in this disclosure, a "sensor" is a device that is configured to detect a characteristic and/or a phenomenon and transmit information related to the detection. In one or more embodiments, sensor 136 includes an accelerometer. In one or more embodiments, sensor 136 may transmit/receive signals to/from controller 132. Signals may include electrical, electromagnetic, visual, audio, radio waves, or another undisclosed signal type alone or in combination. In other embodiments, sensor 136 may transmit a signal directly to a pyrotechnical component of device 100, as discussed further below.

In one or more embodiments, sensor 136 may include a plurality of independent sensors, where any number of the described sensors may be used to detect any number of physical or electrical quantities associated with an emergency scenario of electric aircraft 108. Independent sensors may include separate sensors measuring physical or electrical quantities that may be powered by and/or in communication with circuits independently, where each may signal sensor output to a controller 132 such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 136 to detect phenomenon may be maintained.

In one or more embodiments, sensor 136 may include a high-voltage interlock loop (HVIL). A high-voltage interlock loop includes a low-voltage loop that monitors one or more high voltage connectors of electrical connection 116. If HVIL is broken then datum is transmitted to controller 132, which then enables safety mechanism 120. A HVIL a wire, such as first conductor 124 and/or second conductor 128 of electrical connection 116 may be pulled taught so that, upon a crash, any portion of electrical connection 116 in an crush zone 144 of fuselage 148, such as nose 152 or body 156, may be physically snapped by the force of the crash. Thus, in some non-limiting embodiments, HV component 112 may be position away from power source 104 so that first conductor 124 and/or second conductor 128 are each position or traverse through locations of electric aircraft fuselage that are likely to receive crush zones 144 in a crash scenario. This allows for nearly instantaneous termination of electrical connection 116.

Still referring to FIG. 1, sensor 136 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 136 may include, torque sensor, gyroscope, accelerometer, torque sensor, magnetometer, inertial measurement unit (IMU), pressure sensor, force sensor, proximity sensor, displacement sensor, vibration sensor, LIDAR sensor, and the like thereof. In a non-limiting embodiment, sensor 136 ranges may include a technique for the measuring of distances or slant range from an observer including sensor 136 to a target which may include a plurality of outside parameters. "Outside parameter," for the purposes of this disclosure, refer to environmental factors or physical electric vehicle factors including health status that may be further be captured by a sensor 136. The outside parameter may include, but not limited to air density, air speed, true airspeed, relative airspeed, temperature, humidity level, and weather conditions, among others. The outside parameter may include velocity and/or speed in a plurality of ranges and direction such as vertical speed, horizontal speed, changes in angle or rates of change in angles like pitch rate, roll rate, yaw rate, or a combination thereof, among others. The outside parameter may further include physical factors of the components of the electric aircraft itself including, but not limited to, remaining fuel or battery. The outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. Sensor 136 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and pressure sensor. Sensor 136 may include circuitry, controllers, electronic components or a combination thereof that translates sensor datum into at least an electronic signal configured to be transmitted to another electronic component.

With continued reference to FIG. 1, sensor 136 may further include a sensor suite. Signals of sensor may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. In a non-limiting embodiment, sensor 136 may include a proximity sensor. A proximity sensor may be able to detect a closeness of an aircraft of electric aircraft 108, such that if aircraft is collapsed due to an impact, proximity sensor may detect the altered distance between airframe and proximity sensor due to the crash. In a non-limiting embodiment, the proximity sensor may include, for example, a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In an embodiment, the proximity sensor may be configured to detect the location of a region of an airframe and/or fuselage 156 of electric aircraft 108 from proximity sensor, and angle or curvature of a region of fuselage 156, and a velocity or deacceleration electric aircraft 108 and/or a region of electric aircraft 108 during a crash.

With continued reference to FIG. 1, in some embodiments, sensor 136 may include a pressure sensor. A "pressure", for the purposes of this disclosure, and as would be appreciated by someone of ordinary skill in the art, is a measure of force required to stop a fluid from expanding and is usually stated in terms of force per unit area. In non-limiting exemplary embodiments, a pressure sensor may be configured to measure an atmospheric pressure and/or a change of atmospheric pressure. Pressure sensor may include a piezoresistive strain gauge pressure sensor, resonant pressure sensor, thermal pressure sensor, ionization pressure sensor, capacitive pressure sensor, electromagnetic pressure sensor, force balancing pressure sensor, piezoelectric pressure sensor, strain-gauge pressure sensor, optical, potentiometric pressure sensor, any combination thereof, and the like. In some embodiments, pressure sensor may be configured to detect if a region and/or surface of fuselage 156 has come into contact with pressure sensor due to a crash or impact. In some embodiments, a pressure sensor may be configured to transform a pressure into an analogue electrical signal. In some embodiments, the pressure sensor may be configured to transform a pressure into a digital signal. Pressure sensor may detect With continued reference to FIG. 1, in one or more embodiments, sensor 136 may include electrical sensors. Electrical sensors may be configured to measure voltage across a component, electrical current through a component, and resistance of a component. In one or more embodiments, sensor 136 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 136, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection. In some embodiments, sensor 136 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like.

In one or more embodiments, sensor 136 may include an imaging device, such as a visible spectrum camera or an infrared camera. Imaging device may capture a representation of an external environment to imaging device, such as a surrounding environment of electric aircraft 108 or an interior of electric aircraft 108. Imaging device may be processed so that the processed image may be used to determine if electric aircraft is about to experience a crash or has already experienced a crashed. Sensor 136 may process captured image or sensor may transmit captured image to a remote computing device, such as controller 132.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a controller or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, device 100 may include a controller 132 that initiates movement of safety mechanism 120 to an enabled position when a crash and/or impact of electric aircraft 108 occurs. For instance, and without limitation, controller 132 triggers safety mechanism 120 by instructing safety mechanism 120 to move from a disabled position to an enabled position, which terminates and/or reduces a flow of electrical power in electrical connection 116 of power source 104, such as between power source 104 and HV component 112 or between battery modules and/or cells or power source 104. For example, and without limitation, controller 132 triggers safety mechanism 120 by instructing safety mechanism 120 to move from a disabled position to an enabled position, which physically severs electrical connection 116 so that electricity cannot flow between power source 104 and HV component 112 because first conductor 124 and second conductor 128 are disconnected from each other. Controller 132 may instruct safety mechanism 120 to move into an enable position by generating an initiation signal, which is a function of an emergency parameter. Emergency parameter may be determined as a function of received sensor datum from sensor 136, as discussed further in this disclosure. Controller 132 may be attached to safety mechanism 120 or remote to safety mechanism 120. Controller may generate an initiation signal as a function of a detected emergency parameter, where the initiation signal results in movement of safety mechanism 120 from a disabled position to an enabled position. In one or more embodiments, controller 132 may receive a signal from a pilot, such as via a flight controller or manual actuation of, for example, a switch, to enable safety mechanism 120.

In one or more embodiments, device 100 may include a plurality of safety mechanisms 120 that may be dispersed throughout an electrical system of electric aircraft 108 and each safety mechanism 120 may be independently controlled by controller 132. For example, and without limitation, an impact may be detected in nose 152 of electric aircraft 108, by a local sensor 136 in nose 152. Controller 132 may then initiate a disconnection protocol that only disconnects electrical connections to HV components 112 within a certain vicinity of a corresponding crush zone 144 or of a predetermined likeliness of causing harm in the instance of a crash. In another exemplary embodiment, and without limitation, an impact may occur in a wing of electric aircraft 108; sensor 136 local to the impacted region may then transmit associated sensor datum to controller 132 regarding the location and severity of the impact. Controller 132 may then determine which safety mechanisms 120, such as an inverter or motor of a flight component attached to the impacted wing, to enable and whether the electrical connection 116 is terminated or reduced to a low voltage connection until the damage from the impact is resolved, as discussed further in this disclosure.

On one or more embodiments, controller 132 may include, without limitation, a microcontroller, microprocessor, digital signal processor (DSP), processor, flight controller, control circuit, computing device, and/or system on a chip (SoC), as described in this disclosure. Controller may include, be included in, and/or communicate with a mobile device such as a mobile telephone or smartphone. controller 132 may include a single controller operating independently, or may include two or more controller operating in concert, in parallel, sequentially or the like; two or more controllers may be included together in a single controller or in two or more controllers. controller 132 may interface or communicate with one or more additional devices as described below in further detail via a network interface device. Network interface device may be utilized for connecting controller 132 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two controllers, and any combinations thereof. A network may employ a wired and/or a wireless mode of communication. In general, any network topology may be used. Information (e.g., data, software etc.) may be communicated to and/or from a computer and/or a computing device. Controller 132 may include but is not limited to, for example, a computing device or cluster of computing devices in a first location and a second computing device or cluster of computing devices in a second location. Controller 132 may include one or more computing devices dedicated to data storage, security, distribution of traffic for load balancing, and the like. Controller 132 may distribute one or more computing tasks as described below across a plurality of controllers of controller, which may operate in parallel, in series, redundantly, or in any other manner used for distribution of tasks or memory between controllers. Controller 132 may be implemented using a "shared nothing" architecture in which data is cached at the worker, in an embodiment, this may enable scalability of system 100 and/or controller.

With continued reference to FIG. 1, controller 132 may be designed and/or configured to perform any method, method step, or sequence of method steps in any embodiment described in this disclosure, in any order and with any degree of repetition. For instance, controller 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, controller 132 is configured to receive a sensor datum from sensor 136 associated with a crash of electric aircraft 108. In a non-limiting embodiment, sensor 136 may be configured to detect sensor datum. A "sensor datum," for the purpose of this disclosure, is any datum or element of data describing parameters captured by sensor describing a crash of electric aircraft. For example and without limitation, sensor datum may include, but is not limited to, a detected impact experienced by an area, such as crush zone 144 of fuselage 148 of electric aircraft 108, an abrupt stop or deacceleration of electric aircraft 108, a temperature of one or more regions within electric aircraft 108, a captured image, any combination thereof, and the like. In a non-limiting embodiment, sensor datum may include any data captured by any sensor as described in the entirety of this disclosure. Additionally and alternatively, sensor datum may include any element or signal of data that represents an electric aircraft route and various environmental or outside parameters. In a non-limiting embodiment, sensor datum may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, sensor 136 may be configured to transmit sensor datum to controller 132 via a communicative connection 140. Communicative connection 140 may be a wired or wireless connection. In a non-limiting embodiment, controller 132 may be connected to a network. A "network", for the purpose of this disclosure, is any medium configured to facilitate communication between two or more devices. The network may include, but not limited to, an artificial neural network, wireless network, radio network, electrical network, broadcast network, and the like thereof. In some cases, the network may communicate encrypted data. As used in this disclosure, "encrypted data" is any communicable information that is protected or secured by any method, including obfuscation, encryption, and the like. Encrypted data may include information protected by any cryptographic method described in this disclosure.

With continued reference to FIG. 1, controller 132 may be configured to determine crash element and, in response to the determined crash element, initiate an emergency disconnection protocol that terminates electrical connection 116 as a function of sensor datum. For purposes of this disclosure, a "crash element" is information associated with a present-time impact or collision experienced by electric aircraft. In one or more embodiments, crash element may be determined as a function of sensor datum, as discussed further in this disclosure. Crash element may include a qualitative or quantitative values representing information regarding a crash of electric aircraft 108. Crash element may include a confirmation that a crash has in fact occurred. Crash element may also include a numerical value that represents a degree or a severity of the confirmed impact. For example, and without limitation, a numerical value representing an impact force of the crash (e.g., g-force). In some embodiments, the numerical values associated with the crash may initiate varying types of disconnection protocols by controller 132, as previously mentioned in this disclosure. For example, and without limitation, if a numerical value of crash element, such as an impact force, is determined to be below a preconfigured threshold, then disconnection protocol may include instructions to reduce a power flow through electrical connection 116 instead of completely terminating electrical connection 116. In another example, and without limitation, if a numerical value of crash element, such as an impact force, is determined to be above a preconfigured threshold, then disconnection protocol may include instructions for safety mechanism 120 to terminate or sever electrical communication to one or more HV components 120. With continued reference to FIG. 1, controller 132 may be configured to generate disconnection protocol as a function of crash element. Disconnection protocol may execute a near instantaneous termination of electrical connection 116 using safety mechanism 120 to readily avoid harm to personnel, electrical aircraft 108, or a surrounding environment. For the purposes of this disclosure, a "threshold" is a set desired range and/or value that, if exceeded by a value of sensor datum, initiates a specific reaction of controller 132. A specific reaction may be, for example, disconnection protocol. The threshold may be set by, for example, a user or controller 132 based on, for example, prior use or an input. In one or more embodiments, if sensor datum is determined to be outside of a threshold, crash element is determined by controller 132 and disconnection protocol is generated specific to determined crash element, as previously discussed.

In one or more embodiments, disconnection protocol may include instructions directed to only certain types of safety mechanisms 120 of device 100. For example, and without limitation, if safety mechanism 120 includes a plurality of varying types of safety mechanisms 120, such as contactors and pyrotechnical devices, then disconnection protocol may, for example, only instruct contactors to move to an enabled position but not pyrotechnical devices. In another example, and without limitation, only safety mechanisms 120 in direct contact with certain HV components 112 or within a specific distance from crush zone 144 may be moved to an enabled position by disconnection protocol from controller 132. Controller 132 may transmit disconnection protocol to all safety devices 120 of device 100 or may selectively transmit disconnection protocol to certain safety mechanisms 120, such as for at least reasons previously mentioned in this disclosure. In some embodiments, controller 132 may be configured to disable electrical connection 116 based on crash element. In one or more embodiments termination of electrical connection 116 may include any electrical disconnection and/or mechanical disconnection.

A "disconnection," for the purpose of this disclosure, is any detachment of any electrical, physical, or communicative connection associated with the connection between power source 104 and HV component 112 as described herein. For the purposes of this disclosure, a "disconnection protocol" is a signal transmitted to and/or initiate safety mechanism 120 in a response to crash element, and providing instructions and/or a command to disable and/or terminate electrical connection 116 between power source 104 and HV component 112. "Initiating," for the purpose of this disclosure, is transmitting a signal to triggering the process of disconnection protocol, including one or more instructions for the completion and/or execution of the process. For example, and without limitation, disconnection protocol may eliminate one or more secure connections, unsecure connections, loose connections, faulty connections, and the like thereof by any means of disconnection. In a non-limiting example, disconnection protocol may include one or more physical disconnections such as severing a wire and/or cable or opening a circuit. Disconnection protocol 120 may include disabling and/or disconnecting any electrical connection associated with a high voltage system of electric aircraft 108. Disconnection protocol may include disabling and/or disconnecting any mechanical connection associated with electrical connection 116. A "mechanical connection", for the purpose of this disclosure, is a joining of mechanical components to transfer forces between each other. In a non-limiting embodiment, disconnecting a mechanical connection may include enabling safety mechanism 120, as previously discussed in this disclosure.

With continued reference to FIG. 1, in one or more embodiments, if crash element is detected or disconnection protocol initiated, such as an immediate termination of electrical connection 116, then controller 132 may also generate a signal to notify users, support personnel, safety personnel, flight crew, maintainers, operators, emergency personnel, aircraft computers, or a combination thereof. Device 100 may include a remote display. A display may be connected to electric aircraft 108 or a remote device. Display may be configured to show crash element and corresponding information to a user. If a user is notified of a crash element, a user may manually initiate disconnection protocol. For example, and without limitation, a user may use a button, switch, lever, touchscreen, and the like, to enable one or more safety mechanisms 120 of device 100.

With continued reference to FIG. 1, controller 132 may be a controller. As used in this disclosure, a "controller" is a logic circuit, such as an application-specific integrated circuit (ASIC), FPGA, comparator, Op-amp current source circuit, microcontroller, processor, computing device, any combination thereof, and the like, that is configured to control a device and/or system. In some embodiments, disconnection protocol of controller 132 may be analog. In some cases, the disconnection protocol may be digital. In one or more embodiments, disconnection protocol may be communicated according to one or more communication protocols, for example and without limitation Ethernet, universal asynchronous receiver-transmitter, and the like. In some cases, the disconnection protocol may be a serial signal. In some cases, disconnection protocol may be a parallel signal. Disconnection protocol may be communicated by way of a network, such as, for example, a controller area network (CAN). In some cases, controller 132 may include a user interface. User interface may allow personnel to interface with controller 132 and thereby control any component of device 100, including but not limited to safety device 120. In some cases, user interface may be configured to communicate information, such as without limitation crash element information and/or data or disconnection protocol information and/or data to personnel. For example, and without limitation, user interface may provide indications of which safety mechanisms were moved to an enabled position by disconnection protocol, such as by providing a location of safety mechanism within electric aircraft 108, information regarding the type of safety mechanism, and the like.

With continued reference to FIG. 1, controller 132 may train a machine-learning model (shown in FIG. 7) as a function of a training data set (also referred to as a "training set"). Controller 132 may be configured to output crash element as a function of training set. Training set may correlate any past instances of sensor datum 108 detected from previous instances in which crash element have been determined and disconnection protocol have been generated/initiated. All instances may be stored in a database wherein controller 132 may retrieve a training set from. In a non-limiting embodiment, controller 132 may receive sensor datum and determine the correct disruption element based on the training set that best correlates sensor datum to a disruption element retrieved from the database. The training set may be used as an input for a machine-learning algorithm which may be used by the machine-learning model to output crash element, which is a determination of a disconnection. In one or more embodiments, a second training data set may be used to update machine-learning model. Persons skilled in the art, upon reviewing the entirety of this disclosure, will be aware of the various embodiments of machine-learning for purposes as described herein.

Figure 2:
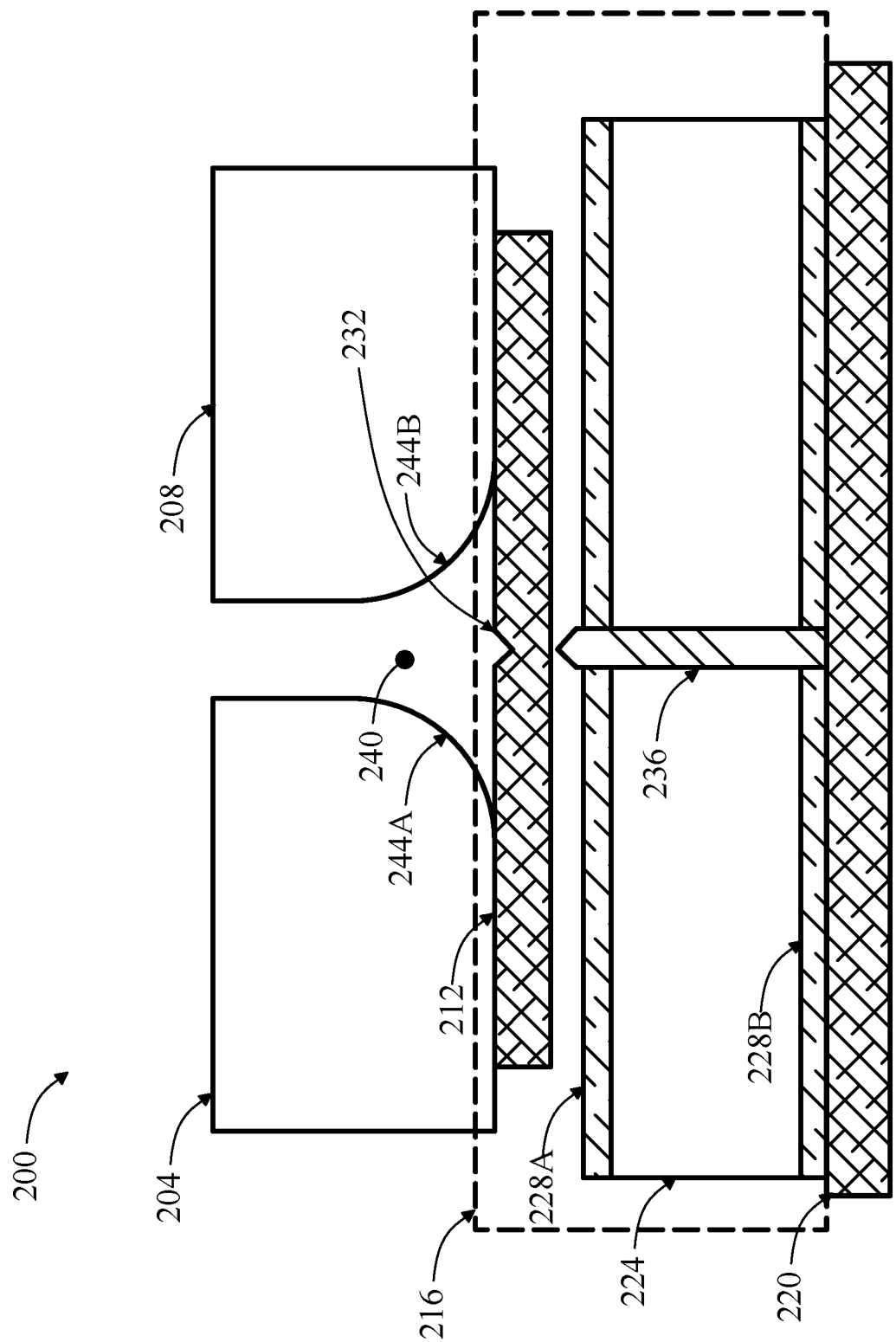
FIG. 2 is a schematic diagram of an exemplary frangible connection in an unbroken state in accordance with one or more embodiments of the present disclosure.

Referring now to FIG. 2, an exemplary embodiment of safety mechanism is schematically shown. In one or more embodiments, safety mechanism 120 may include an exemplary frangible connection mechanism 200. As used in this disclosure "frangible" is an attributive which refers to a components tendency to break apart (i.e., disintegrate or shatter) or yield on impact or under predetermined loading. In some embodiments, a frangible material may break apart or yield on impact in order to limit potential hazards (i.e., to fail safe). In one or more embodiments, power source 104 may include a battery pack, which may include a plurality of connected battery modules. In a non-limiting embodiment, power source 104 includes a first battery module 204 in electrical connection (e.g., via electrical connection 116) with a second battery module 208, where electrical connection is provided by way of a frangible connection 212 (i.e., frangible bus). In some cases, frangible connection 212 may comprise one or more material attributes that include brittle, soft, and fragile. For instance, in some non-limiting examples frangible connection may comprise a material having a yield strength no greater than 10 MPa, no greater than 5 Mpa, or no greater than 1 MPa. In some cases, frangible connection may comprise at least one of aluminum, copper, gold, nickel, and/or silver. In some cases, frangible connection 212 may be located substantially within a crush zone. In some embodiments, a crush zone may be crush zone 144, which is located on any portion of fuselage and/or an airframe of aircraft 108, such as nose or body, as discussed in this disclosure. In other embodiments, crush zone may be located within power source 104, such as, for example, a crush zone 216 between one or more battery modules and an inner wall of a case 220. Crush zone 216 in some embodiments may be configured to allow room for one or more battery modules to decelerate and lose kinetic energy during an impact, for instance before coming into a collision with case 220 or another large object, such as ground. According to some embodiments, a compressible material 224 may be located between one or more battery modules and case 220. As described above, compressible material 224 may include any material which may absorb and/or dissipate energy as it is compressed. In some cases, a compressible material 224 may comprise one or more of a composite material with voids, and/or a compressible fluid, such as without limitation air or nitrogen. In some cases, compressible material may include an incompressible fluid such as without limitation oil and/or grease. In some cases, compressible material includes a foam or a cellular matrix. In some embodiments, compressible material 224 may be flanked on one or more sides by a composite sheet 228A-B. Composite sheet 228A-B in some cases, may be non-conductive and serve to prevent short circuiting of one or more battery modules. For instance, composite sheet 228A-B, in some embodiments, may comprise one or more polymers, such as without limitation polytetrafluoroethylene (PTFE), polyethylene (PE), and the like.

Continuing in reference to FIG. 2, in some embodiments, frangible connection 212 may include a score 232. A score 232 may include any feature intended to structurally weaken frangible connection 212, such as without limitation a notch, a groove, a perforation, a composite bridge (e.g., a soldered connection), and the like. In some cases, a weakening of frangible connection 212 may be configured to contribute to a breaking and disconnection of the frangible connection 212, for instance during an impact or under a predetermined loading condition (i.e., a connection breaking force). Non-limiting exemplary connection breaking force include between about may include forces resulting from decelerations, including impulsive impact derived decelerations, in excess of 4, 12, 20, 50, or 100 G's. In some embodiments, at least a breakaway mount may be configured to release first battery module under a battery breakaway force that is no greater than a connection breaking force.

In some instances, a die 236 may be placed near a frangible connection 212, for instance without limitation opposite a score 232. As used in this disclosure, a "die" is a component that is intended to impart deformation forces to another component, such as without limitation a frangible connection. In some cases, a die 236 may be configured to introduce a pressure or an approximated point or line force at a predetermined location along frangible connection 212, for instance between a first battery module 204 and a second battery module 208. In some cases, die may comprise an electrically insulating material, for instance without limitation one or more of a ceramic, a plastic, a coated or composite metal component, a glass, and the like. In some cases, die 236 may be wholly composed of a non-conductive material. Alternatively, in some cases, die 236 may only partially be composed of a non-conductive material; for example, the die may include an aluminum substrate coated with a non-conductive coating, for instance alumina. In some cases, die 236 may be shaped like a wedge with an edge of the wedge directed to contact at or near a score 232 within frangible connection 212. In some embodiments a relief 240 may be located near frangible connection 212. As used in this disclosure, a "relief" is an area or volume that is substantially free from material and thereby provides space for other components or portions of components to occupy, such as without limitation a deformed frangible connection. Relief 240 may allow room for deformation of frangible connection 212, for example during a crash. Relief 240 may be located proximal to a side of frangible connection that is opposite die. In some cases, at least a profile 244A-B may aid in controlled breaking of frangible connection 212. For instance, in a non-limiting example, at least a profile 244A-B may include one or more of a radii or a chamfer configured to impart a load (e.g., bending moment, shear force, and the like) upon frangible connection 212 in certain circumstances. In some embodiments, die 236 may be configured not only to break or disconnect frangible connection 212, but may also be configured to separate two or more resulting portions of frangible connection from one another once separated.

Figure 3:
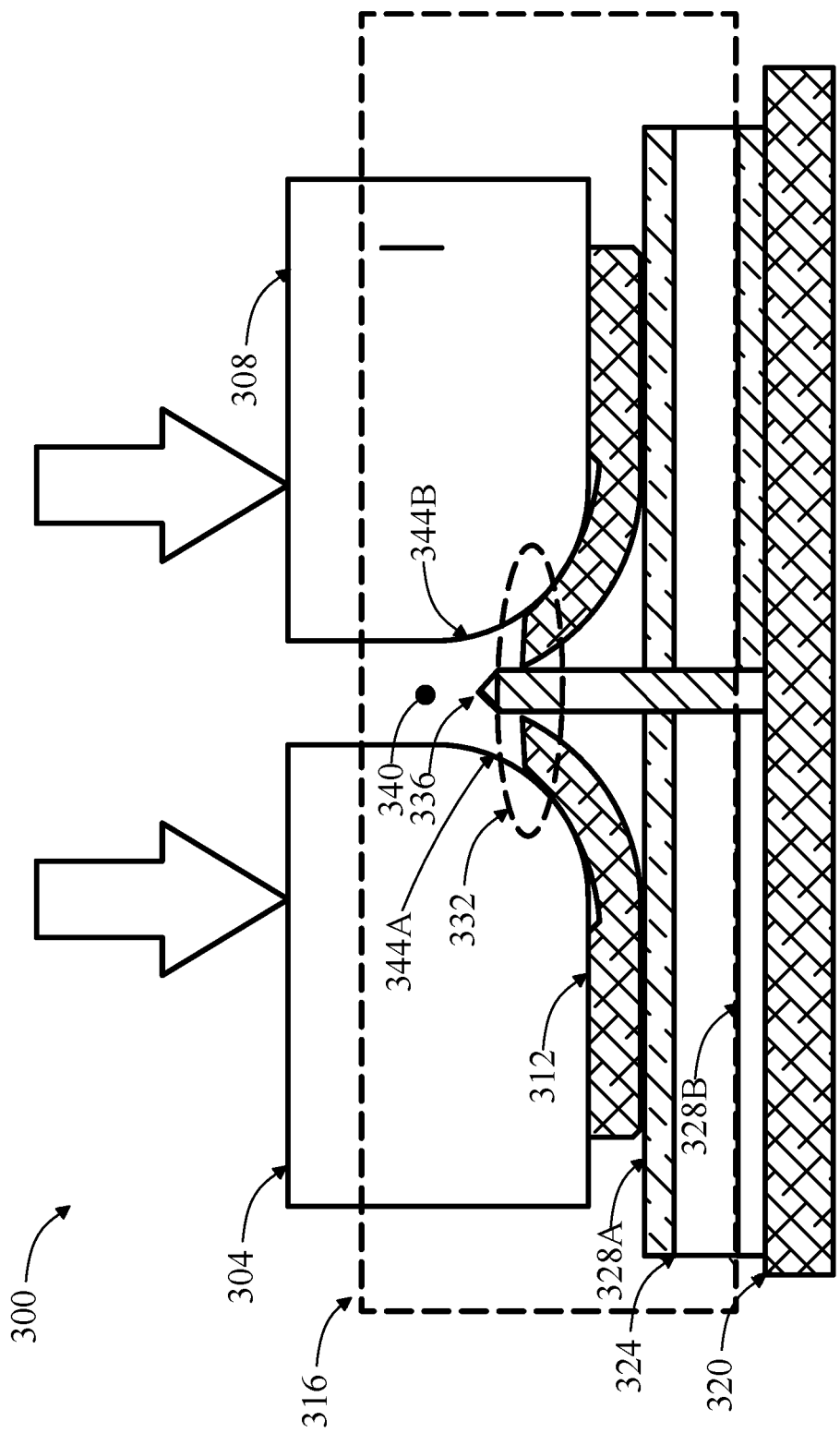
FIG. 3 is a schematic diagram of an exemplary frangible connection in a broken state in accordance with one or more embodiments of the present disclosure.

Referring now to FIG. 3, an exemplary frangible connection mechanism 300 is schematically shown after frangible connection has been broken and disconnected. A first battery module 304 is shown in electrical isolation with a second battery module 308, where electrical isolation is provided by way of a frangible connection 312 (i.e., frangible bus). FIG. 3 shows both first battery module 304 and second battery module 308 have encroached a crush zone 316 located between the first battery module 304, the second battery module 308 and an inner wall of a case 320. According to some embodiments, a compressible material 324 may be located between one or more battery modules and case 320. As a result of battery modules entering crush zone, compressible material 324 may compress, thereby absorbing and/or dissipating energy as it is compressed. In some embodiments, compressible material 324 may be flanked on one or more sides by a composite sheet 328A-B. Composite sheet 328A-B, in some cases, may be non-conductive and serve to prevent short circuiting of one or more battery modules.

Continuing in reference to FIG. 3, in some embodiments, frangible connection 312 in a broken state may include a discontinuity 332. A discontinuity 332 may occur along any point on frangible connection 312, between first battery module 304 and second battery module 308. In some cases, discontinuity 336 may occur where a score or another weakening feature is present on an intact frangible connection. In some cases, a weakening of frangible connection may be configured to contribute to a forming of a discontinuity 332 and disconnection of the frangible connection 312, for instance during an impact or under a predetermined loading condition. In some instances a die 336 may be placed to aid in forming discontinuity 332. For instance, a die 336 placed near a frangible connection 312, may under predetermined conditions impart one or more of a pressure, an approximated point force, and/or an approximated line force, thereby forming a discontinuity 332. As described above, in some cases, die 336 may comprise an electrically insulating material, so that after forming discontinuity 332 within frangible connection 312, resulting two or more constituents of the frangible connection 312 remain electrically isolated from one another by the die 336. In some cases, die 336 may be shaped like a wedge with an edge of the wedge directed to contact at or near a score 332 within frangible connection 312. In some embodiments a relief 340 may be located near frangible connection 312. Relief 340 may allow room for deformation of frangible connection 312, for example during a crash. In some cases, at least a profile 344A-B may aid in controlled breaking of frangible connection 212. For instance, in a non-limiting example, at least a profile 344A-B may include one or more of a radii or a chamfer configured to impart a load (e.g., bending moment, shear force, and the like) upon frangible connection 312 in certain circumstances. According to some embodiments, battery pack may be configured to fail safe when impact occurs in a predetermine direction. The emergency high voltage disconnection device may be consistent with the frangible connection mechanism disclosed in patent application Ser. No. 17/564,430, entitled "SYSTEMS AND METHODS FOR REDISTRIBUTING ELECTRICAL LOAD IN AN ELECTRIC AIRCRAFT", which is incorporated in this disclosure in its entirety.

In one or more embodiments, device 100 may be disposed outside of power source 104, as shown in FIG. 1. In other embodiments, device 100 may be disposed within power source 104. Power source may include a battery pack, which may include one or more battery modules, as described further below. Battery pack may include an outer case. In some embodiments, case may be made from metal for example one or more of sheet metal, stamped metal, extruded metal, and/or machined metal. In some embodiments, case may be held together by one or more fasteners (e.g., sheet metal screws, machine screws, threaded inserts, snaps, and the like). Alternatively or additionally, in some embodiments, case may be formed by way of welding, brazing, and/or soldering. In some embodiments, case may include a relatively light and strong metal, for instance aluminum alloy. Case may include an outer case, which substantially encloses a plurality of battery modules. Alternatively or additionally, case may only partially enclose plurality of battery modules, for instance as with an exoskeleton-like case or where the case includes an internal frame. In some instances, battery modules may be connected in series to one another, such that a total potential for the connected battery modules together is greater than a potential for any one of the battery modules. In some cases, a shared electrical connection from plurality of modules may be accessible by way of a connector. In some cases, connector may have a polarity and include a positive connection and a negative connection. In some cases, one or more battery modules of plurality of battery modules may be mounted to case by way of at least a breakaway mount. In some embodiments, a breakaway mount may include any means for attachment that is configured to disconnect under a predetermined load. In some cases, breakaway mounts may be passive and rely upon loading forces for disconnection, for instance non-limiting exemplary breakaway mounts may include one or more of a shear pin, a frangible nut, a frangible bolt, a breakaway nut, bolt, or stud, and the like. In some cases, a passive breakaway mount includes a relatively soft or brittle material (e.g., plastic) which is easily broken under achievable loads. Alternatively or additionally, a breakaway mount may include a notch, a score line, a perforation, or another weakening feature purposefully introduced to the breakaway mount to introduce breaking at a prescribed load. According to some embodiments, a canted coil spring may be used to as part of a breakaway mount, to ensure that the mount disconnects under a predetermined loading condition. In some cases a mount may comprise a canted coil spring, a housing, and a piston; and sizes and profiles of the housing and the piston may be selected in order to prescribe a force required to disconnect the mount. An exemplary canted coil spring may be provided by Bal-Seal Engineering, Inc. of Foothill Ranch, Calif., U.S.A. Alternatively or additionally, a breakaway mount may include an active feature which is configured to actively disconnect a mount under a prescribed condition (for instance a rapid change in elevation or large measured G-forces). Much like an airbag that is configured to activate during a crash, an active mount may be configured to actively disconnect during a sensed crash. An active mount may, in some cases, include one or more of an explosive bolt, an explosive nut, an electro-magnetic connection, and the like. In some cases, one or more breakaway mounts may be configured to disconnect under a certain loading condition, for instance a force in excess of a predetermined threshold (i.e., battery breakaway force) acting substantially along (e.g., within about +/−45°) a predetermined direction. Non-limiting exemplary battery breakaway forces may include forces resulting from decelerations, including impulsive impact derived decelerations, in excess of 4, 12, 20, 50, or 100 G's. In some embodiments, a case may include a battery storage zone, for instance within which battery modules are located, and a crush zone. Typically, crush zone may be located between one or more battery modules and an inner wall of case. In some embodiments, crush zone may be substantially empty. Alternatively, in some other embodiments, crush zone may comprise some material, for instance without limitation a compressible material. In some cases, compressible material may be configured to absorb and/or dissipate energy as it is compressed. In some cases, compressible material may include a material having a number of voids, for instance compressible material may take a form of a honeycomb or another predictably cellular form. Alternatively or additionally, compressible material may include a non-uniform material, such as without limitation a foam. In some embodiments, a crush zone may be located down from one or more battery modules substantially along a loading direction, such that for instance the one or more battery modules when disconnected from one or more breakaway mounts are directed toward crush zone. In some cases, case may include one or more channels or guides that are configured to direct at least a battery module into a crush zone, should it become disconnected from the case.

Still referring to FIG. 1, as used in this disclosure "battery module" is any potential energy storage component, such as a storage component of electrical or chemical energy. In some embodiments, battery module may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery modules may include lead-based batteries such as without limitation lead acid batteries and lead carbon batteries. Battery modules may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, electrical communication amongst plurality of battery modules is made with at least a frangible connection.

Figure 4:
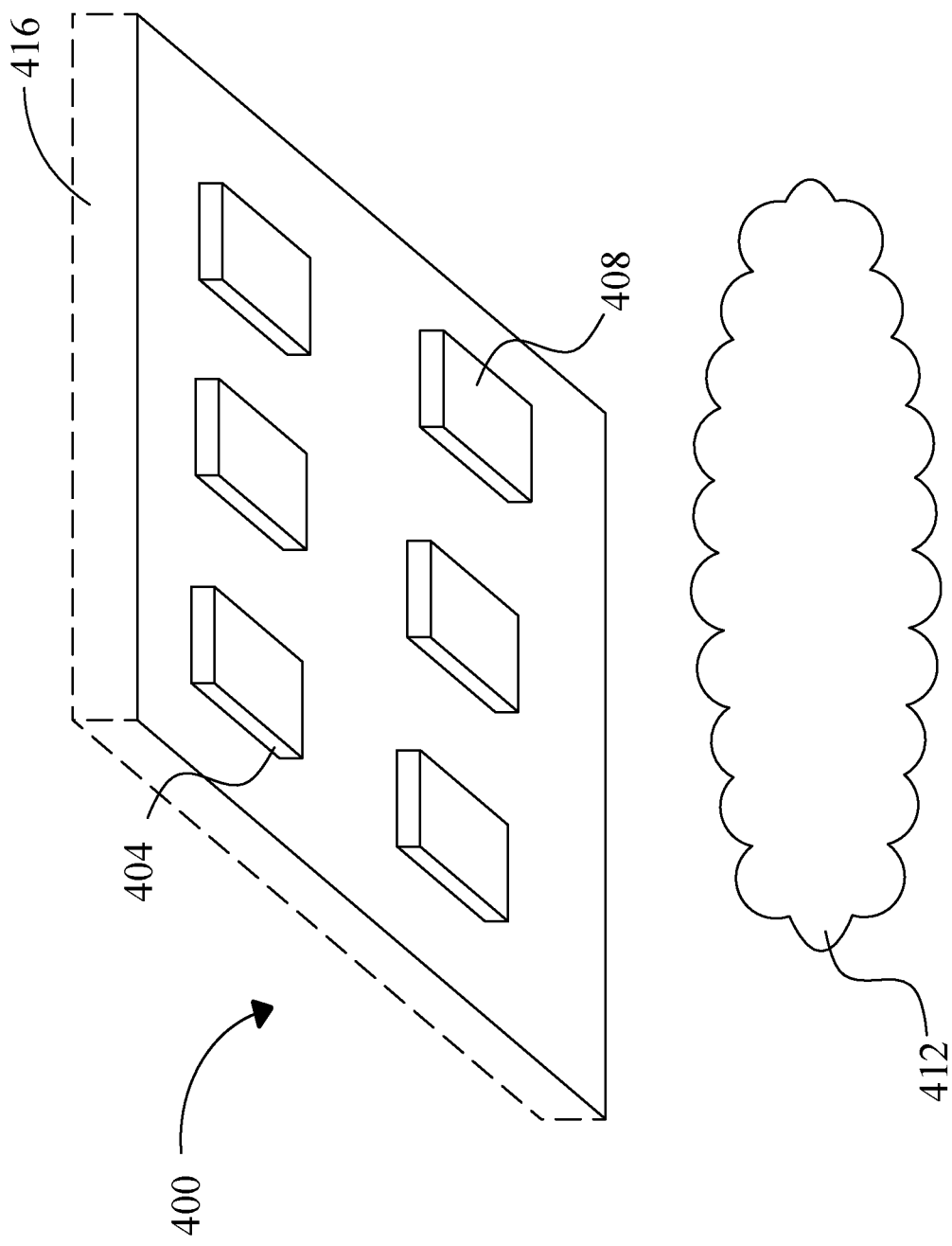
FIG. 4 is a diagrammatic representation of an exemplary embodiment of a sensor suite in accordance with one or more embodiments of the present disclosure.

Referring now to FIG. 4, an embodiment of sensor suite 400 is presented in accordance with one or more embodiments of the present disclosure. The herein disclosed system and method may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors communicatively connected to safety mechanism 120 measuring characteristics of electric aircraft 108 as described previously in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 108 to detect phenomenon is maintained. Sensor suite may include inertia sensors, such as an accelerometer, as previously discussed in FIG. 1. Sensor suite 400 may include electrical sensors 408. Electrical sensors 408 may be configured to measure a voltage of electrical connection 116 to, for example and without limitation, determine is a disconnection of connectors of electric communication has occurred during the crash. Electrical sensors 408 may include separate sensors to measure each of the previously disclosed electrical characteristics such as voltmeter, ammeter, and ohmmeter, respectively.

Sensor suite 400 may include digital sensors, analog sensors, or a combination thereof. Sensor suite 400 may include digital-to-analog converters (DAC), analog-to-digital converters (ADC, A/D, A-to-D), a combination thereof, and the like.

With continued reference to FIG. 4, sensor suite 400 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system.

Temperature, as measured by any number or combinations of sensors present within sensor suite 400, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 4, sensor suite 400 may include a sensor configured to detect gas that may be emitted during or after a cell failure. "Cell failure", for the purposes of this disclosure, refers to a malfunction of a battery cell of a power source, which may be an electrochemical cell, that renders the cell inoperable for its designed function, namely providing electrical energy to at least a portion of an electric aircraft. For example, after a crash power source 104 may experience a cell failure from physical damage to the electric aircraft and thus power source 104. Byproducts of cell failure 412 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 400, may be configured to detect combustible, flammable, toxic, oxygen depleted, a combination thereof, or another type of gas alone or in combination. The gas sensor that may be present in sensor suite 400 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 400 may include sensors that are configured to detect non-gaseous byproducts of cell failure 412 including, in non-limiting examples, liquid chemical leaks including aqueous alkaline solution, ionomer, molten phosphoric acid, liquid electrolytes with redox shuttle and ionomer, and salt water, among others. Sensor suite 400 may include sensors that are configured to detect non-gaseous byproducts of cell failure 412 including, in non-limiting examples, electrical anomalies as detected by any of the previous disclosed sensors or components.

With continued reference to FIG. 4, sensors 408 may be disposed on a sense board 416. In one or more embodiments, sense board 416 may include opposing flat surfaces and may be configured to cover a portion of a battery module within a power source, such as a battery pack. Sense board 416 may include, without limitation, a control circuit configured to perform and/or direct any actions performed by sense board 416 and/or any other component and/or element described in this disclosure. Sense board 416 may be consistent with the sense board disclosed in U.S. patent application Ser. No. 16/948,140 entitled, "SYSTEM AND METHOD FOR HIGH ENERGY DENSITY BATTERY MODULE" and incorporated herein by reference in its entirety.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 5:
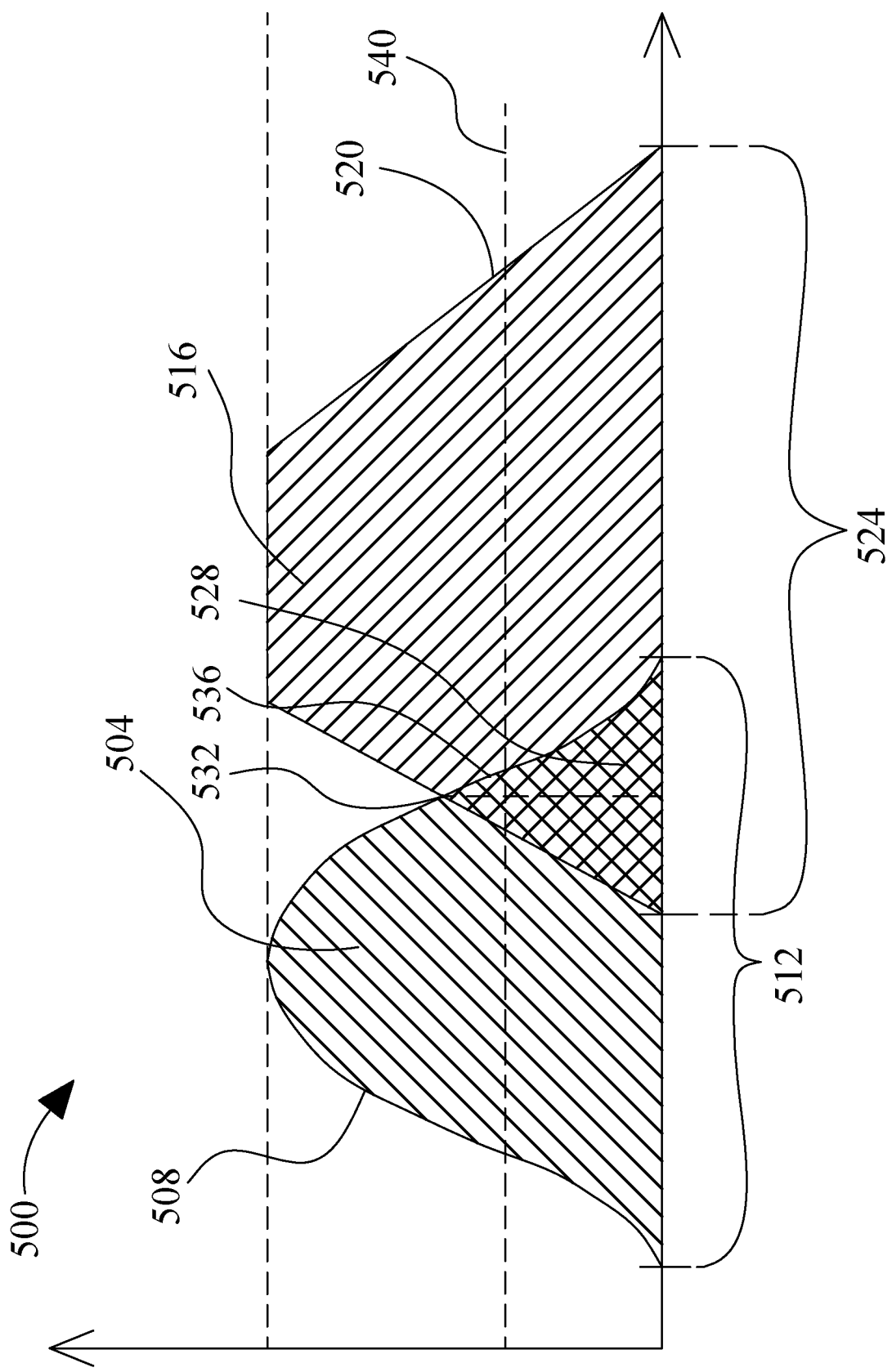
FIG. 5 is a block diagram illustrating exemplary embodiments of fuzzy sets for a threshold in accordance with one or more embodiments of the present disclosure.

Now referring to FIG. 5, an exemplary embodiment of fuzzy set comparison 500 for a threshold is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 5, first fuzzy set 504 may represent any value or combination of values as described above, including any sensor datum 108 such as, but not limited to, rate of charge, rate of discharge, state of health, and the like thereof. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process. For example, and without limitation, the threshold may indicate a sufficient degree of overlap between sensor datum and a value representing a potential crash element that may indicate a sufficient match for purposes of determining crash element. For example, and without limitation, sensor 136 may detect a substantial acceleration of electric aircraft 108, which may be indicative of electric aircraft 108 coming to an abrupt stop by crashing into an external environment. Controller 132 may denote this event as crash element. There may be multiple thresholds; for instance, a second threshold may indicate a sufficient match for purposes of pooling threshold as described in this disclosure. Each threshold may be established by one or more user inputs. Alternatively or additionally, each threshold may be tuned by a machine-learning and/or statistical process, for instance and without limitation as described in further detail below.

With continued reference to FIG. 5, in an embodiment, a degree of match between fuzzy sets may be used to rank one resource against another. For instance, if two predictive prevalence values have fuzzy sets matching a probabilistic outcome fuzzy set by having a degree of overlap exceeding a threshold, controller 132 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple crash element may be presented to a user in order of ranking for purposes of generating emergency disconnection protocol.

Figure 6:
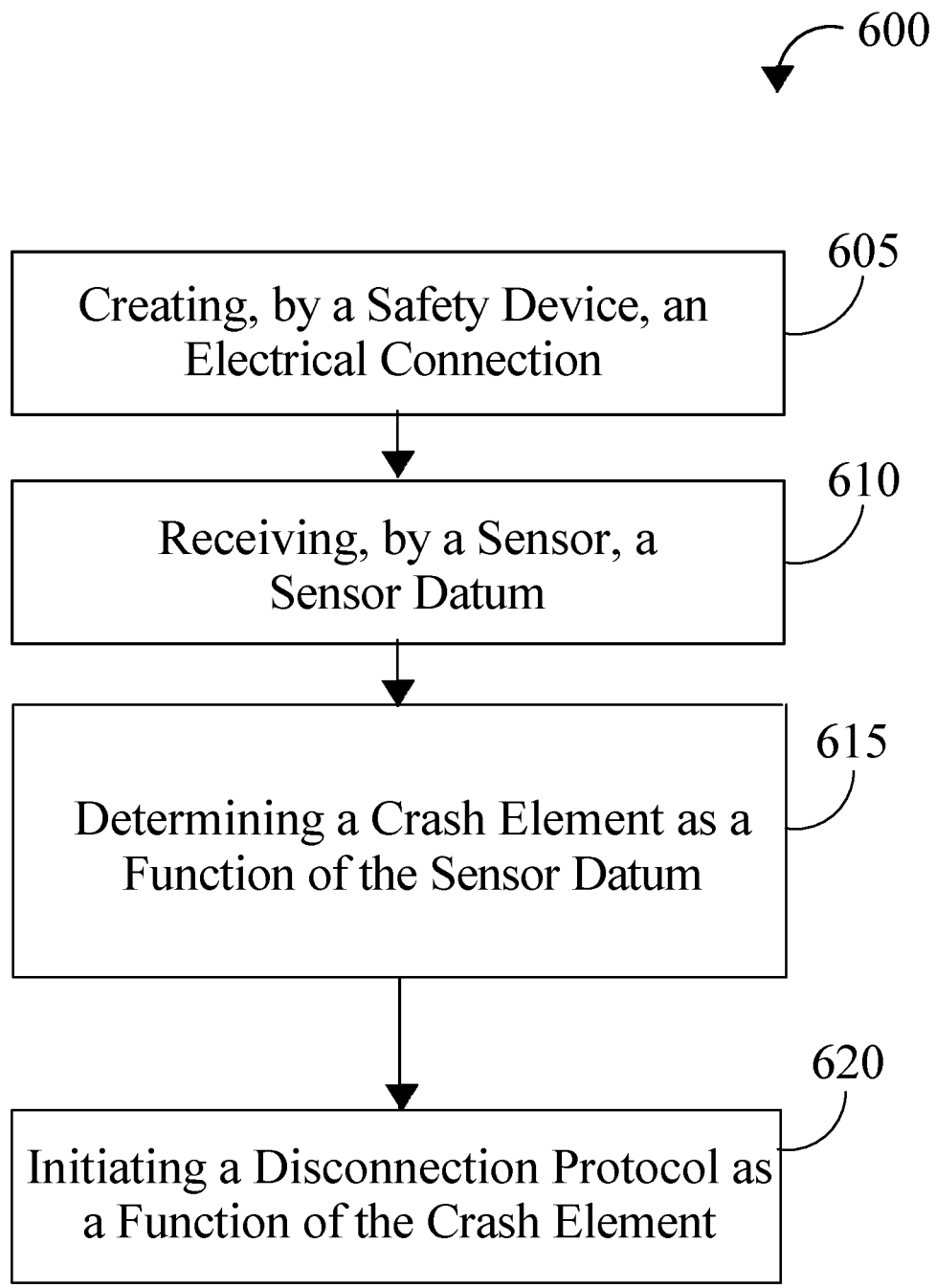
FIG. 6 is a flow diagram of an exemplary embodiment of a method for an emergency shutdown of a high voltage disconnection for a crash scenario in accordance with one or more embodiments of the present disclosure.

Referring now to FIG. 6, a flow diagram of an exemplary embodiment of a method 600 for disconnection of a high voltage electrical connection 116 by device 100 is provided. Method 600, at step 605, creating electrical connection 116. Creating electrical connection 116 includes connecting, by safety mechanism 120 of device 100, first conductor 124 and second conductor 128 to create an electrical connection between power source 104 of electric aircraft 108 and high voltage component 112 of electric aircraft 108, wherein electrical power is transferred between power source 104 and high voltage component 112 via electrical connection 116.

With continued reference to FIG. 6, method 600, at step 610, may include receiving, by sensor 136, sensor datum. Sensor 136 may include any sensor as described herein. Sensor datum may include any sensor datum as described herein. Persons skilled in the art, upon reviewing the entirety of this disclosure, will be aware of the various methods of detecting any data associated with a cash scenario of electric aircraft 108 for purposes as described herein.

With continued reference to FIG. 6, method 600, at step 615, may include determining a crash element, by controller 132, related to electric aircraft 108 as a function of sensor datum received from sensor 136. Electric aircraft 108 may include any electric vehicle as described herein. Crash element may include any crash element as described herein. Controller 132 may include any controller as described herein. In a non-limiting embodiment, method 600, at step 615, may also include determining an impact force of crash element. Persons skilled in the art, upon reviewing the entirety of this disclosure, will be aware of the various methods of determining a crash of electric aircraft 108 based on sensor data for purposes as described herein.

With continued reference to FIG. 6, method 600, at step 620, may include initiating a disconnection protocol as a function of the crash element. The disconnection protocol may include any disconnection protocol as described herein. In a non-limiting embodiment, method 600, at step 620, may also moving safety switch 120 to an enabled position as described herein. Persons skilled in the art, upon reviewing the entirety of this disclosure, will be aware of the various embodiments of generating and initiating the disconnection protocol for purposes as described herein.

Figure 7:
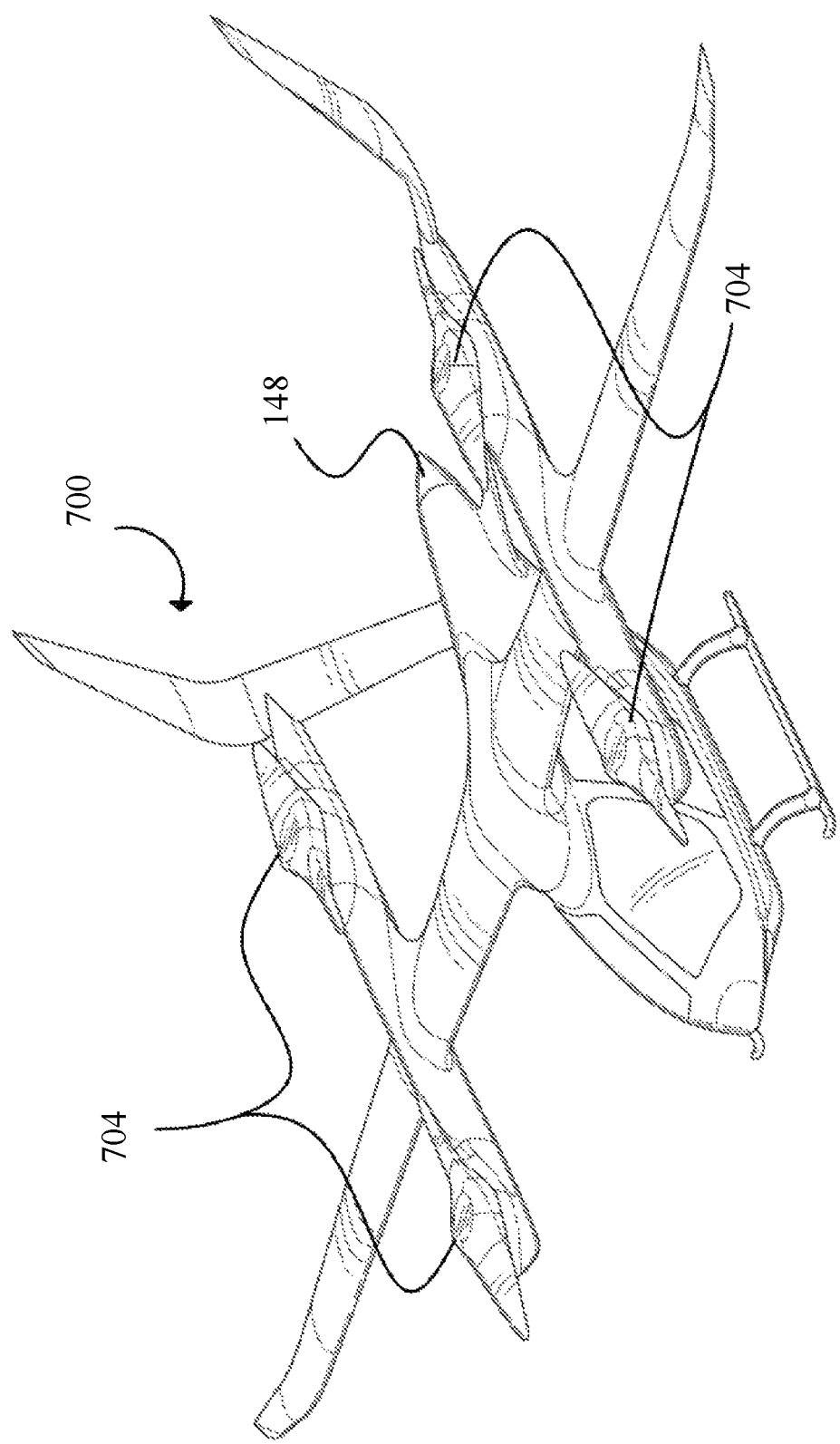
FIG. 7 is an illustration of an exemplary embodiment of an electric aircraft in accordance with one or more embodiments of the present disclosure.

Referring now to FIG. 7, an exemplary embodiment of an aircraft 700, which may include device 100 in case of a cash scenario, is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 7, aircraft 700 may include an electrically powered aircraft. In embodiments, electrically powered aircraft may be an electric vertical takeoff and landing (eVTOL) aircraft. Aircraft 500 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 5.

Still referring to FIG. 7, aircraft 700 includes a fuselage 148. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 148 may include structural elements that physically support a shape and structure of an aircraft. Structural elements may take a plurality of forms, alone or in combination with other types. Structural elements may vary depending on a construction type of aircraft such as without limitation a fuselage 148. Fuselage 148 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 7, aircraft fuselage 148 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 148 orthogonal to a longitudinal (nose to tail) axis of the aircraft and may form a general shape of fuselage 148. A former may include differing cross-sectional shapes at differing locations along fuselage 148, as the former is the structural element that informs the overall shape of a fuselage 148 curvature. In embodiments, aircraft skin may be anchored to formers and strings such that the outer mold line of a volume encapsulated by formers and stringers comprises the same shape as aircraft 700 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 7, fuselage 148 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 7, fuselage 148 may include a semi-monocoque construction. Semi-monocoque construction, as used herein, is a partial monocoque construction, wherein a monocoque construction is describe above detail. In semi-monocoque construction, aircraft fuselage 148 may derive some structural support from stressed aircraft skin and some structural support from underlying frame structure made of structural elements. Formers or station frames can be seen running transverse to the long axis of fuselage 148 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 7, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 7, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 148. Monocoque comprises only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 7, it should be noted that an illustrative embodiment is presented only, and this disclosure in no way limits the form or construction method of a system and method for loading payload into an eVTOL aircraft. In embodiments, fuselage 148 may be configurable based on the needs of the eVTOL per specific mission or objective. The general arrangement of components, structural elements, and hardware associated with storing and/or moving a payload may be added or removed from fuselage 148 as needed, whether it is stowed manually, automatedly, or removed by personnel altogether. Fuselage 148 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 148 may also be configurable to accept certain specific cargo containers, or a receptable that can, in turn, accept certain cargo containers.

Still referring to FIG. 7, aircraft 700 may include a plurality of laterally extending elements attached to fuselage 148. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 7, aircraft 700 includes a plurality of flight components 704. As used in this disclosure a "flight component" is a component that promotes flight and guidance of an aircraft. In an embodiment, flight component 704 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 7, plurality of flight components 704 may include at least a lift propulsor component. As used in this disclosure a "lift propulsor component" is a component and/or device used to propel a craft upward by exerting downward force on a fluid medium, which may include a gaseous medium such as air or a liquid medium such as water. Lift propulsor component may include any device or component that consumes electrical power on demand to propel an electric aircraft in a direction or other vehicle while on ground or in-flight. For example, and without limitation, lift propulsor component may include a rotor, propeller, paddle wheel and the like thereof, wherein a rotor is a component that produces torque along the longitudinal axis, and a propeller produces torquer along the vertical axis. In an embodiment, lift propulsor component includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 10.7° as a function of a pitch angle of 17.1° and a relative wind angle 16.4°, wherein the angle adjusts and/or shifts to a second angle of 16.7° as a function of a pitch angle of 16.1° and a relative wind angle 16.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 7, lift propulsor component may be configured to produce a lift. As used in this disclosure a "lift" is a perpendicular force to the oncoming flow direction of fluid surrounding the surface. For example, and without limitation relative air speed may be horizontal to aircraft 700, wherein lift force may be a force exerted in a vertical direction, directing aircraft 700 upwards. In an embodiment, and without limitation, lift propulsor component may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component to produce lift.

In an embodiment and still referring to FIG. 7, plurality of flight components 504 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 30° from the longitudinal axis of aircraft 700. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 7, plurality of flight components 704 may include a pusher component 516. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 700 in a horizontal direction along a longitudinal axis. As a further non-limiting example, pusher component may twist and/or rotate to pull air behind it and, at the same time, push aircraft 700 forward with an equal amount of force. In an embodiment, and without limitation, the more air forced behind aircraft, the greater the thrust force with which the aircraft is pushed horizontally will be. In another embodiment, and without limitation, forward thrust may force aircraft 700 through the medium of relative air. Additionally or alternatively, plurality of flight components 704 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 5, aircraft 500 may include a flight controller located within fuselage 148, wherein a flight controller is described in detail below, in reference to FIG. 5. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 50 and one or more airfoil shapes of the laterally extending elements, wherein an airfoil is described above in detail. As a further non-limiting example, flight controller may operate the fixed-wing flight capability as a function of reducing applied torque on lift propulsor component. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component. For example, and without limitation, flight controller may increase a forward thrust of 1000 kN produced by pusher component to a forward thrust of 1100 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 700. Inertia compensator may alternatively or additionally include any computing device used as an inertia compensator as described in U.S. Nonprovisional application Ser. No. 17/106,557, and entitled "SYSTEM AND METHOD FOR FLIGHT CONTROL IN ELECTRIC AIRCRAFT," the entirety of which is incorporated herein by reference.

In an embodiment, and still referring to FIG. 7, flight controller may be configured to perform a reverse thrust command. As used in this disclosure a "reverse thrust command" is a command to perform a thrust that forces a medium towards the relative air opposing aircraft. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust.

Figure 8:
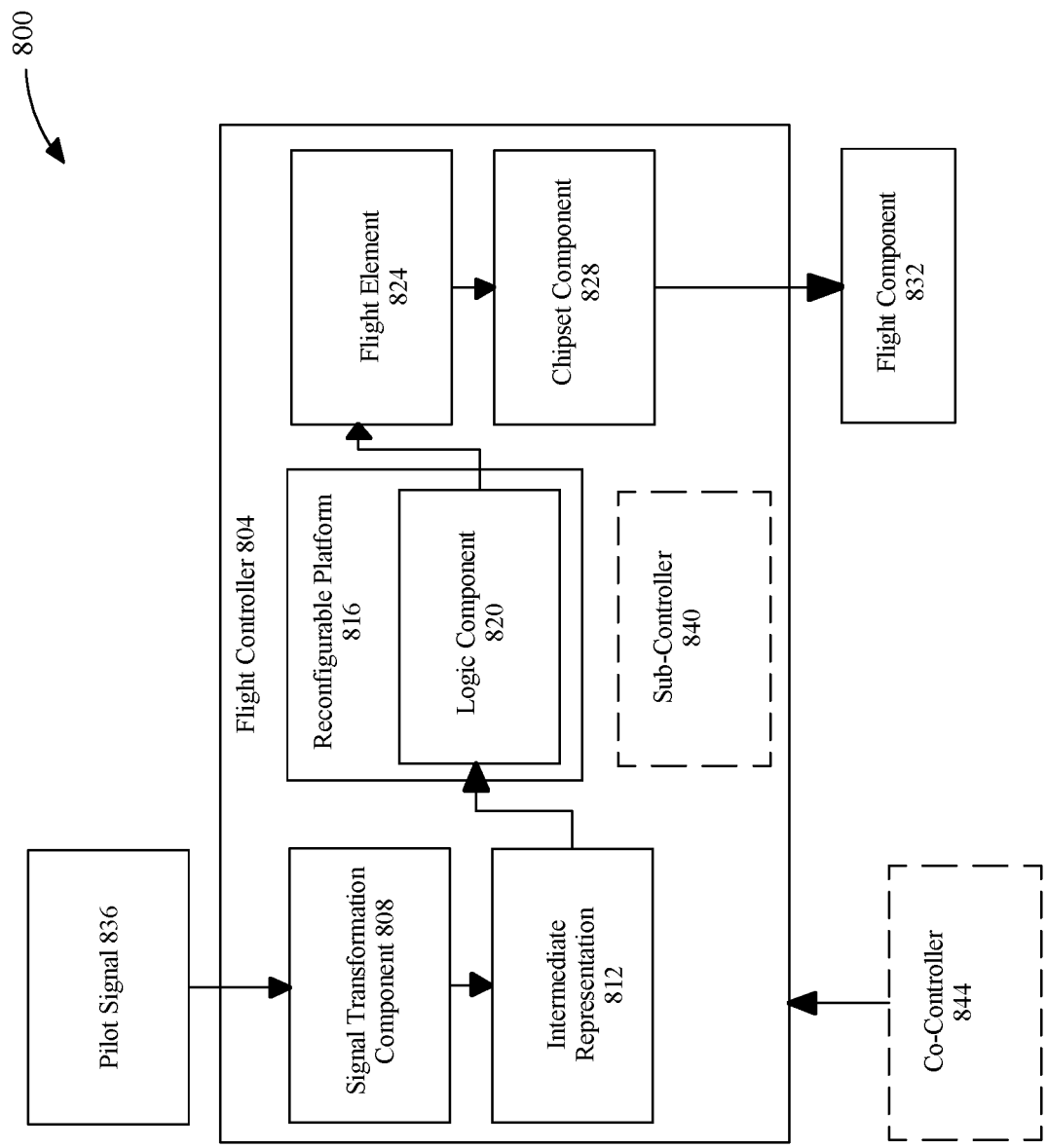
FIG. 8 is a block diagram of an exemplary flight controller in accordance with one or more embodiments of the present disclosure.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 6-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 832 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA.

In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 8, control algorithm may optimize signal communication as a function of determining one or more discrete timings. For example, and without limitation master bus controller may synchronize timing of the segmented control algorithm by injecting a high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above. In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
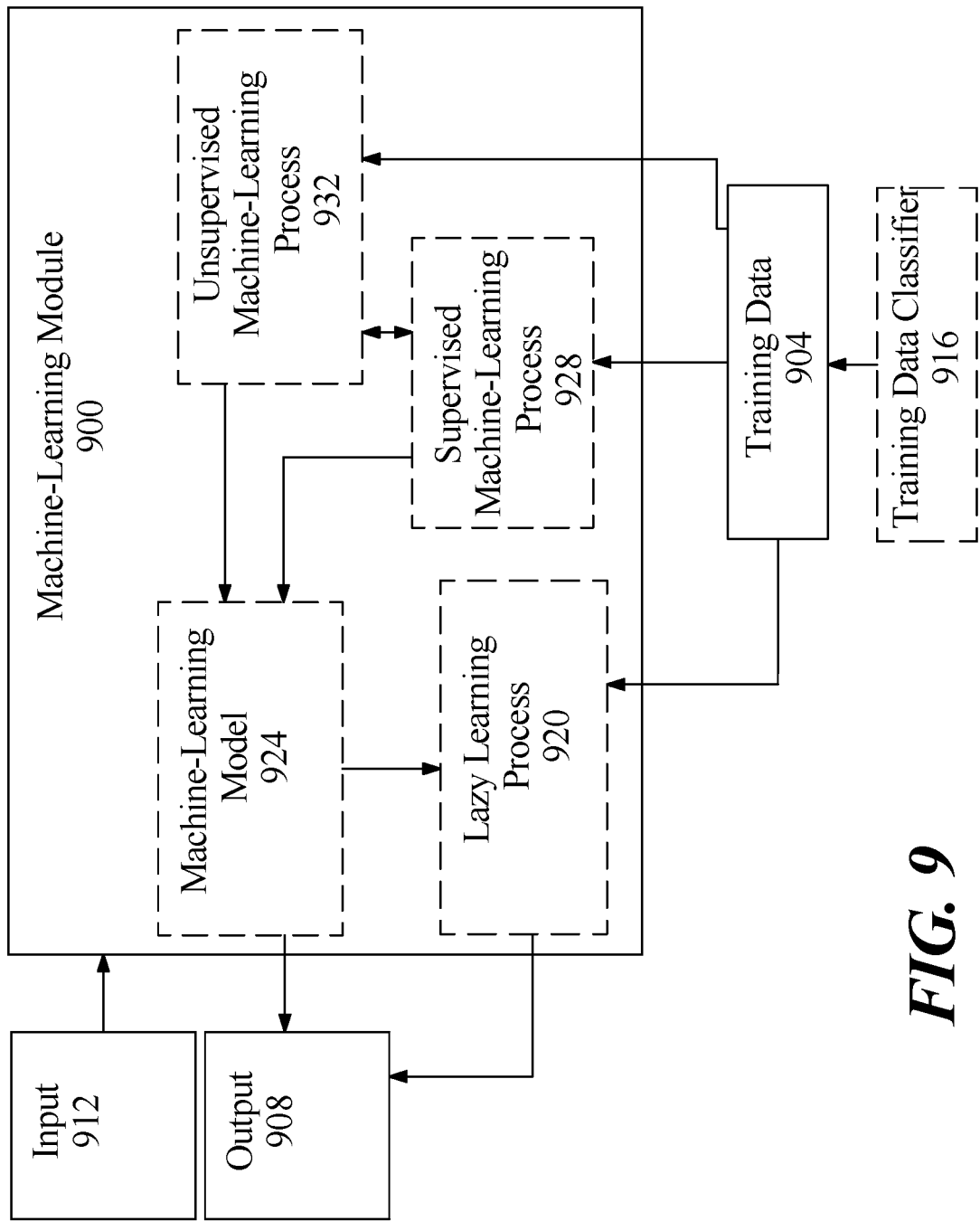
FIG. 9 is a block diagram of an exemplary machine-learning process in accordance with one or more embodiments of the present disclosure.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine-learning processes. A "machine-learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative examples, a sensor datum may be an input and a disruption element may be an output.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 916 may classify elements of training data to disruption element into various levels of danger levels and/or priority levels, wherein the higher levels may denote the response of an emergency protocol for which a subset of training data may be selected.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a sensor datum as an input, a disruption element as an output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
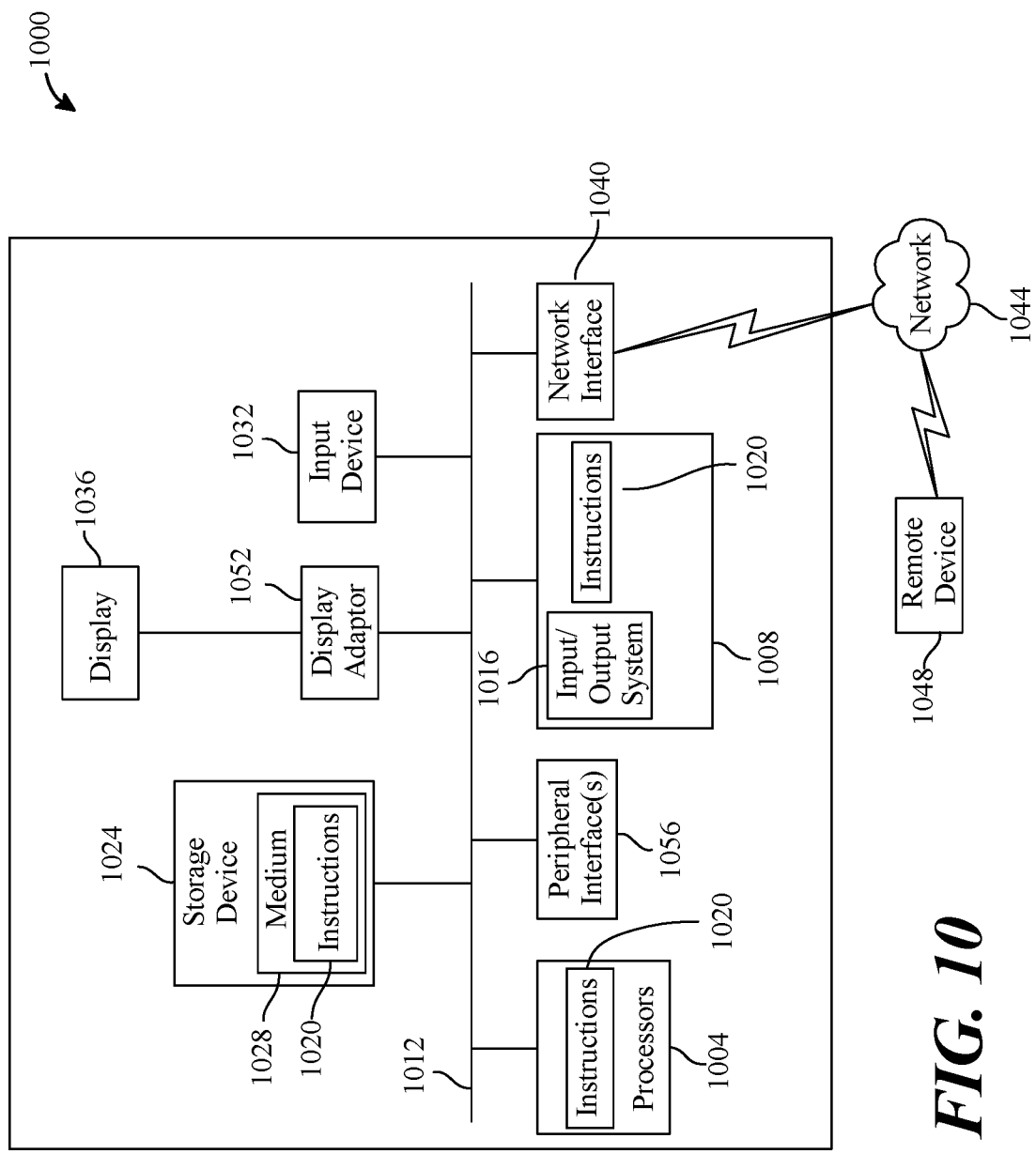
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An emergency high voltage disconnection device for an electric aircraft, the device comprising:
a an electrical connection configured to transfer electrical power from a power source of an electric aircraft, wherein the electrical connection comprises:
a first conductor attached to a power source; and
a second conductor attached to the first conductor; and
a safety mechanism connected to the first conductor and the second conductor, the safety mechanism comprising:
a frangible connection comprising a score, wherein the score is configured to structurally weaken the frangible connection; and
a die configured to break the frangible connection by engaging the score;
the safety mechanism having an enabled position and a disabled position, wherein the safety mechanism is configured to:
allow, in the disabled position, the transfer of electrical power from the first conductor to the second conductor;
terminate, in the enabled position, the electrical connection, wherein the safety mechanism moves from the disabled position to the enabled position upon the electric aircraft experiencing a crash.

2. The device of claim 1, further comprising:
a sensor configured to detect a crash element as a function of the crash of the electric aircraft; and
a controller in communicative communication with the sensor and the safety mechanism,
wherein the controller is configured to:
receive a sensor datum from the sensor;
determine a crash element associated with the crash of the electric aircraft as a function of the sensor datum; and
initiate a disconnection protocol as a function of the crash element, wherein the disconnection protocol comprises moving the safety mechanism from the disabled position to the enabled position.

3. The device of claim 2, wherein: the safety mechanism includes a plurality of safety mechanisms; and the disconnection protocol includes instructions for each safety mechanism of the plurality of safety mechanisms.

4. The device of claim 1, wherein terminating the electrical connection comprises mechanically severing, by the safety mechanism, a connection between the first conductor and the second conductor.

5. The device of claim 1, wherein the safety mechanism comprises a pyrotechnical device.

6. The device of claim 1, wherein the safety mechanism comprises a contactor.

7. The device of claim 1, wherein the sensor comprises an accelerometer.

8. The device of claim 1, wherein the safety mechanism comprises a frangible bus.

9. The device of claim 1, wherein the crash element comprises an impact force value.

10. The device of claim 1, wherein the safety mechanism includes a plurality of safety mechanisms.

11. A method for emergency disconnection of an electric connection of a power source of an electric aircraft in response to a crash, the method comprising:
providing an emergency high voltage disconnection device, the device comprising:
an electrical connection, wherein the electrical connection comprises:
a first conductor attached to a power source; and
a second conductor attached to the first conductor; and
a safety mechanism connected to the first conductor and the second conductor, the safety mechanism having a frangible connection comprising a score configured to structurally weaken the frangible connection and configured to be in an enabled position and a disabled position, and the safety mechanism further comprising a die configured to break the frangible connection by engaging the score;
transferring, in a disabled position of the device, electrical power from a power source from the first conductor to the second conductor; and
terminating, in an enabled position of the device, the electrical connection so that electrical power cannot traverse from the first conductor to the second conductor, wherein the safety mechanism moves from the disabled position to the enabled position upon the electric aircraft experiencing a crash.

12. The method of claim 11, further comprising: receiving, by a sensor of the device, a sensor datum associated with a crash of the electric aircraft; determining, by a controller of the device communicatively connected to the sensor and the safety mechanism, a crash element as a function of the sensor datum; and initiating, by the controller, a disconnection protocol as a function of the crash element, wherein the disconnection protocol comprises instructions that move the safety mechanism from a disabled position to an enabled position to terminate the electrical connection.

13. The method of claim 12, wherein:
the safety mechanism includes a plurality of safety mechanisms; and
the disconnection protocol includes instructions for each safety mechanism of the plurality of safety mechanisms.

14. The method of claim 11, wherein terminating the electrical connection comprises mechanically severing, by the safety mechanism, a connection between the first conductor and the second conductor.

15. The method of claim 11, wherein the safety mechanism comprises a pyrotechnical device.

16. The method of claim 11, wherein the safety mechanism comprises a contactor.

17. The method of claim 11, wherein the sensor comprises an accelerometer.

18. The method of claim 11, wherein the safety mechanism comprises a frangible bus.

19. The method of claim 11, wherein the crash element comprises an impact force value.

20. The method of claim 11, wherein the safety mechanism includes a plurality of safety mechanisms.

* * * * *